Jan 6, 1931.  G. E. BIGELOW ET AL  1,787,810
NONLUBRICATED BEARING
Filed March 31, 1930
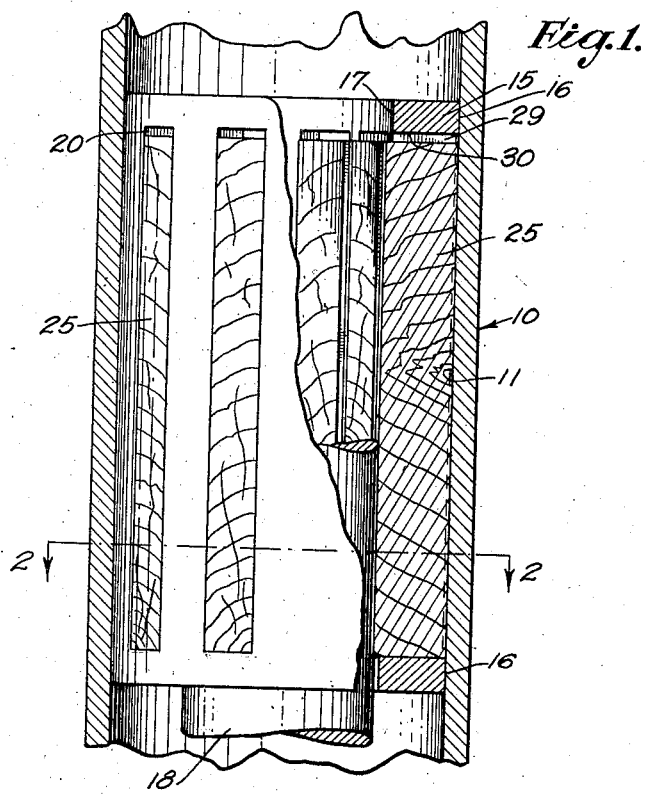
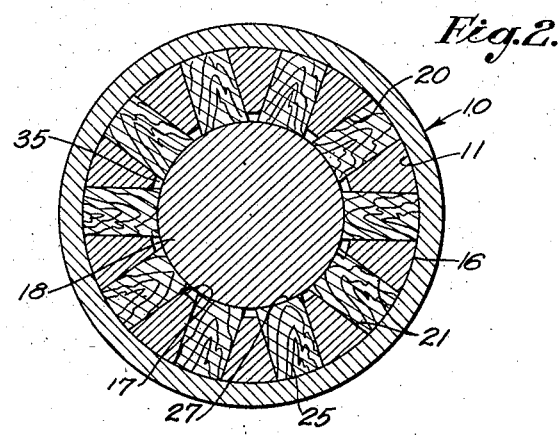
INVENTORS:
GEORGE E. BIGELOW,
ARTHUR R. WEIS,
BY
ATTORNEY Patented Jan. 6, 1931

1,787,810

UNITED STATES PATENT OFFICE

GEORGE E. BIGELOW, OF SOUTHGATE, AND ARTHUR R. WEIS, OF HUNTINGTON PARK, CALIFORNIA, ASSIGNORS TO PACIFIC PUMP WORKS, OF HUNTINGTON PARK, CALIFORNIA, A CORPORATION OF CALIFORNIA

NONLUBRICATED BEARING

Application filed March 31, 1930. Serial No. 440,237.

Our invention relates to bearings, and more particularly to an improved bearing structure for correctly journalling a shaft even where the bearing structure is subjected to adverse conditions.

Attempts have been made to utilize bearing segments formed of wood for journalling a rotating shaft, these segments being suitably secured in a retaining structure usually by being pressed tightly into openings thereof. When such segments are impregnated with a lubricant, such as oil, they serve as a very successful bearing means for a rotating shaft, unless subjected to adverse conditions. The adverse condition most frequently encountered is that of moisture, and it has heretofore been impossible to install such a bearing with a close shaft clearance due to the fact that moisture will cause expansion or swelling and will make the bearing segments bind the shaft. This defect has prevented the use of this type of bearing in many installations where it would otherwise be very desirable.

It is an object of our invention to provide a bearing structure having a bearing segment which is expansible under adverse conditions, but which will not bind the shaft or materially change its journalling relationship relative to the shaft under such adverse conditions.

This we accomplish by so mounting the segment relative to a retainer that it may freely expand in one direction, but so that it is restrained from expansion in another direction and also in a radial direction.

It is an object of the invention to provide a mounting for a bearing segment which permits expansion thereof in at least one direction.

A further object of the invention is to provide a retainer having a relatively long opening therein in which is retained a bearing segment, the length of the bearing segment being less than the length of the opening.

A further object of the invention is to provide an improved bearing structure requiring no lubrication subsequent to installation.

Further objects and advantages of the invention will be evident hereinafter.

The preferred embodiment of the invention is disclosed in the drawing, wherein—

Fig. 1 is a view, partially in section, of our bearing structure.

Fig. 2 is a view taken on the line 2—2 of Fig 1.

Referring particularly to these figures, the numeral 10 represents a supporting means of any suitable construction, this supporting means including an opening bounded by an inner cylindrical face 11.

Adapted to extend into this opening is a bronze retainer 15 providing an outer cylindrical face 16 which is only slightly less in diameter than the diameter of the inner cylindrical face 11 so that the retainer 15 may be held in the supporting means 10 by being pressed therein. The retainer 15 provides an inner cylindrical face 17 which is slightly larger in diameter than the diameter of a shaft 18 which is to be journalled by the bearing structure. The retainer 15 has a plurality of rectangular openings 20 formed therein each of these openings being preferably formed so as to extend radially through the retainer 15 and providing parallel side walls 21.

Adapted to be retained in each of the openings 20 is a bearing segment 25 formed of wood or other material which is capable of journalling the shaft 18. We prefer to form these bearing segments of a relatively hard wood, such as maple or lignum-vitæ, each segment being formed of a width substantially equal to the distance between the side walls 21 so as to be capable of being tightly pressed therein, the end grain of this bearing segment engaging the periphery of the shaft 18. It is desirable to curve the inner ends of these bearing segments to form arcuate surfaces 27 corresponding in curvature to the shaft 18.

It is similarly desirable to form the outer ends of the bearing segments 25 to correspond to the curvature of the outer cylindrical face 16 of the retainer 15, so that these bearing segments are in surface contact with the inner cylindrical face 11 of the supporting means 10, thus preventing any radial movement thereof.

In actual practice, we prefer to force the bearing segments into place in their corresponding openings of the retainer 15, and subsequently place the retainer and its associated bearing segments in a lathe and simultaneously turn them down until the outer cylindrical face 16 is of such a diameter as to form a press fit in the supporting means 10. It is usually preferable to also turn down the arcuate faces 27 either before or after turning down the outer cylindrical face 16, the surfaces 27 being turned to such a diameter as to correctly journal the shaft 18. The clearance between the shaft 18 and the bearing segments is usually made not greater than several thousandths of an inch.

A very important feature of the invention lies in the fact that the length of each bearing segment 25 is less than the length of the opening 20 in which it is retained. This is best illustrated in Fig. 1, which shows a clearance space 29 formed between an end wall 30 of the opening and the end of the bearing segment 25. The difference in length between the bearing segment and its associated opening is usually made in the neighborhood of one-sixteenth of an inch with a bearing segment approximately four inches in length, although it should be understood that this ratio is not invariable, certain woods requiring more space for expansion than do others.

When such a bearing structure is subjected to adverse conditions wherein the bearing segments 25 tend to expand or swell, these segments will expand longitudinally inasmuch as they are retained from swelling transversely by the side walls 21. By utilizing the end grain of the wood for journalling the shaft 18 the tendency toward expansion in a radial direction is almost eliminated. However, if this clearance space is not used and the bearing segments are retained from movement in more than one direction, any swelling thereof invariably tends to bind the shaft 18. This is due to the fact that a body subjected to forces in two directions will tend to expand in a third direction, usually perpendicular to the forces. Such an expansion in a third direction we have termed a compressive expansion. It has heretofore been impossible to utilize such bearings due to this binding difficulty, but actual tests have proved that the bearing structure herein disclosed is not materially affected by moisture in so far as binding is concerned.

We prefer to suitably impregnate the bearing segments with oil or other lubricant prior to the time they are positioned in the retainer 15, this being accomplished by pressure or vacuum means well known in the art. By forming these bearing segments so that they extend inside the inner cylindrical face 17, there is formed a plurality of lubricant-retaining spaces 35 which are preferably filled with a hard lubricant when the bearing is first installed. Such a bearing will run indefinitely without attention, the lubricant impregnated in and retained by the bearing segments being sufficient to give a very excellent journalling action.

While we have shown a clearance space 30 as being provided at but one end of each bearing segment, it should be clear that these clearance spaces may be provided on opposite ends if desired. Furthermore, while we have shown the walls 21 as being parallel, this detail of construction is not essential to our invention, for diverging or converging walls might also be utilized.

Furthermore, while we have shown the major axis of the openings 20 as being parallel to the axis of the shaft 18, this is not essential to the present invention. This major axis may extend around the shaft 18 in the form of a helix or may lie in a plane perpendicular to the axis of the shaft 18. The construction illustrated is, however, the cheapest and most practical when it is desired to journal a rotating shaft.

We claim as our invention:

1. In a bearing structure for journalling a shaft and capable of correctly journalling said shaft under adverse conditions: a retainer providing elongated openings having side walls and end walls; and a bearing segment pressed into each of said openings and formed of wood with the end grain contacting said shaft, the width of each bearing segment being such as to form a press fit with said side walls of said opening in which it is positioned, the length of said bearing segment being shorter than the distance between said end walls of said opening in which it is positioned to permit expansion thereof under said adverse condition in a direction along the length of said elongated opening.

2. In a bearing structure for journalling a shaft under adverse conditions: a retainer providing outer and inner cylindrical faces and a plurality of radially extending elongated openings communicating with said faces said elongated openings extending entirely through the retainer; a bearing segment in each of said openings, each bearing segment being formed of wood which expands under said adverse conditions and providing an end-grained face extending inward beyond said inner cylindrical face to engage the periphery of said shaft, and providing an opposite arcuate face shaped to conform to and be flush with said outer cylindrical face, each bearing segment being saturated with a lubricant and formed of a width snugly fitting its associated opening and of a length slightly less than the length of its associated opening so as to permit longitudinal expansion; and means extending around said retainer and said bearing segments in clamping relationship to prevent any substantial radial movement of said bearing segments, said means providing an inner cylindrical face corresponding in curvature to said external cylindrical face of said retainer and to the arcuate faces of said bearing segments.

3. In a bearing structure adapted to journal a surface, the combination of: side walls and end walls defining an opening communicating with said surface; a wooden bearing segment positioned in said opening and providing an engaging face journalling said surface and presenting the end grain of the wood to said surface, said wooden bearing segment being of a width snugly fitting between said side walls and being of a length less than the distance between said end walls to allow expansion thereof toward said end walls without binding said surface; a wall closing the bottom of said opening and resisting any tendency of said bearing segment to substantially move away from said surface.

4. In a bearing structure adapted to journal a shaft, the combination of: a unitary retainer surrounding said shaft and providing a plurality of openings each of which provides opposed side walls, said retainer providing an internal cylindrical face slightly larger in diameter than said shaft to form an annular space therebetween, said openings opening on said internal cylindrical face; a bearing segment formed of a material which under adverse conditions expands little along a given axis, but expands greater in directions perpendicular to said given axis, one of said bearing segments being positioned in each of said openings in a manner to form a press fit with the side walls thereof, each bearing segment being inserted in its associated opening so that said given axis is radial with respect to said shaft whereby any expansion of said segment in a direction perpendicular to said given axis is made to take place along said opening; and a wall to the rear of said opening for preventing any substantial movement of said bearing segment in said opening in a direction away from said shaft.

5. In a bearing structure adapted to journal a surface, the combination of: side walls and end walls defining an opening communicating with said surface; a bearing segment formed of a material which under adverse conditions expands only minutely along a given axis but which expands substantially greater in directions perpendicular to said given axis, said bearing segment being positioned in said opening and forming a press fit with the side walls thereof but being shorter in length than the distance between said end walls whereby no compressive expansion is set up when said bearing segment is subjected to said adverse condition; and a wall closing the bottom of said opening and preventing any substantial movement of said bearing segment in a direction away from said shaft.

6. In a bearing structure adapted to journal a shaft, the combination of: a supporting means providing an inner cylindrical face; a retainer providing an outer cylindrical surface snugly engaging said inner cylindrical face and providing a plurality of openings, each of which provides opposed side walls, said retainer providing an internal cylindrical face slightly larger in diameter than said shaft to form an annular space therebetween on which said openings open; and a wooden bearing segment in each of said openings and forming a press fit between said side walls, but being slidable along the length of said openings when subjected to moisture, the end grain of said wooden bearing segments engaging said shaft, each of said bearing segments being formed with a rear face corresponding in curvature to said outer cylindrical surface and being flush therewith so as to abut against said inner cylindrical face of said supporting means.

In testimony whereof, we have hereunto set our hands at Los Angeles, California, this 25th day of March, 1930.

GEORGE E. BIGELOW.
ARTHUR R. WEIS.

CERTIFICATE OF CORRECTION.

Patent No. 1,787,810.  Granted January 6, 1931, to

GEORGE E. BIGELOW and ARTHUR R. WEIS.

It is hereby certified that the above numbered patent was erroneously issued to "Pacific Pump Works, of Huntington Park, California, a corporation of California", as assignee of the entire interest in said invention, whereas said patent should have been issued to the inventors said Bigelow and Weis, and Pacific Pump Works, of Huntington Park, California, a corporation of California, said corporation being assignee of one-half interest only in said invention, as shown by the records of assignments in this office; and that the said Letters Patent should be read with this correction therein that the same may conform to the record of the case in the Patent Office.

Signed and sealed this 10th day of February, A. D. 1931.

(Seal)

M. J. Moore,
Acting Commissioner of Patents.